(12) United States Patent
Hasinoff et al.

(10) Patent No.: US 8,995,784 B2
(45) Date of Patent: Mar. 31, 2015

(54) STRUCTURE DESCRIPTORS FOR IMAGE PROCESSING

(71) Applicant: Google Inc., Mountain View, CA (US)

(72) Inventors: Samuel William Hasinoff, Mountain View, CA (US); Changyin Zhou, Mountain View, CA (US)

(73) Assignee: Google Inc., Mountain View, CA (US)

( * ) Notice: Subject to any disclaimer, the term of this patent is extended or adjusted under 35 U.S.C. 154(b) by 171 days.

(21) Appl. No.: 13/743,565

(22) Filed: Jan. 17, 2013

(65) Prior Publication Data

US 2014/0198987 A1    Jul. 17, 2014

(51) Int. Cl.
*G06K 9/40* (2006.01)
*G06K 9/48* (2006.01)
*G06T 5/00* (2006.01)

(52) U.S. Cl.
CPC .......................................... *G06T 5/00* (2013.01)
USPC ............................ 382/275; 382/199; 382/266

(58) Field of Classification Search
None
See application file for complete search history.

(56) References Cited

U.S. PATENT DOCUMENTS

| | | | |
|---|---|---|---|
| 4,644,582 A | 2/1987 | Morishita et al. | |
| 5,781,308 A | 7/1998 | Fujii et al. | |
| 5,828,793 A | 10/1998 | Mann | |
| 5,926,190 A | 7/1999 | Turkowski et al. | |
| 6,061,091 A | 5/2000 | Van De Poel et al. | |
| 6,075,905 A | 6/2000 | Herman et al. | |
| 6,101,285 A * | 8/2000 | Fan ............................... | 382/260 |
| 6,204,881 B1 | 3/2001 | Ikeda et al. | |
| 6,539,116 B2 | 3/2003 | Takaoka | |
| 6,693,718 B1 | 2/2004 | Takaoka | |
| 6,925,121 B1 | 8/2005 | Komiya et al. | |
| 6,975,755 B1 | 12/2005 | Baumberg | |
| 7,173,666 B1 | 2/2007 | Masaki et al. | |
| 7,239,805 B2 | 7/2007 | Uyttendaele et al. | |
| 7,626,614 B1 | 12/2009 | Marcu | |

(Continued)

FOREIGN PATENT DOCUMENTS

| | | |
|---|---|---|
| JP | 2005-045804 | 2/2005 |
| JP | 2012-029029 | 2/2012 |

(Continued)

OTHER PUBLICATIONS

Mandava et al, "Speckle Noise Reduction Using Local Binary Pattern," 2012, ICCCS 2012 : 2nd International Conference on Communication, Computing & Security, Procedia Technology 6, pp. 574-581.*

(Continued)

*Primary Examiner* — Bhavesh Mehta
*Assistant Examiner* — David F Dunphy
(74) *Attorney, Agent, or Firm* — McDonnell Boehnen Hulbert & Berghoff LLP

(57) ABSTRACT

A structure descriptor for an m×n pixel block of an image may be determined. The m×n pixel block may contain a primary pixel having a primary pixel value and a plurality of secondary pixels having respective secondary pixel values. The structure descriptor may include a plurality of structure indicators each associated with a respective secondary pixel. The respective structure indicators may be based on the primary pixel value and the respective secondary pixel value of the associated secondary pixel. Based on the structure descriptor, a structure value for the m×n pixel block may be determined. Based on the structure value, image processing may be applied to the m×n pixel block.

20 Claims, 6 Drawing Sheets

(56) References Cited

U.S. PATENT DOCUMENTS

| | | | |
|---|---|---|---|
| 7,667,764 | B2 | 2/2010 | Kamon et al. |
| 7,840,093 | B2 | 11/2010 | Fu et al. |
| 7,903,168 | B2 | 3/2011 | Pillman et al. |
| 7,924,321 | B2 | 4/2011 | Nayar et al. |
| 7,940,325 | B2 | 5/2011 | Kim et al. |
| 7,944,485 | B2 | 5/2011 | Ovsiannikov |
| 8,023,004 | B2 | 9/2011 | Asoma |
| 8,059,891 | B2 | 11/2011 | Li et al. |
| 8,072,507 | B2 | 12/2011 | Fuh et al. |
| 8,094,211 | B2 | 1/2012 | Kwon et al. |
| 8,200,020 | B1 | 6/2012 | Geiss et al. |
| 8,208,048 | B2 | 6/2012 | Lin et al. |
| 8,237,813 | B2 | 8/2012 | Garten |
| 8,411,962 | B1 | 4/2013 | Geiss et al. |
| 8,446,481 | B1 | 5/2013 | Geiss et al. |
| 2001/0019362 | A1 | 9/2001 | Nakamura et al. |
| 2003/0002750 | A1 | 1/2003 | Ejiri et al. |
| 2003/0095192 | A1 | 5/2003 | Horiuchi |
| 2005/0147322 | A1 | 7/2005 | Saed |
| 2005/0163380 | A1 | 7/2005 | Wang et al. |
| 2005/0239104 | A1 | 10/2005 | Ferea et al. |
| 2005/0243176 | A1 | 11/2005 | Wu et al. |
| 2006/0259155 | A1 | 11/2006 | Kitahara |
| 2006/0291740 | A1 | 12/2006 | Kim et al. |
| 2007/0003261 | A1 | 1/2007 | Yamasaki |
| 2008/0253758 | A1 | 10/2008 | Yap et al. |
| 2008/0278633 | A1 | 11/2008 | Tsoupko-Sitnikov et al. |
| 2008/0298717 | A1 | 12/2008 | Lee |
| 2009/0040364 | A1 | 2/2009 | Rubner |
| 2009/0123082 | A1 | 5/2009 | Atanssov et al. |
| 2009/0185622 | A1 | 7/2009 | Itoh et al. |
| 2009/0207258 | A1 | 8/2009 | Jang et al. |
| 2009/0222625 | A1* | 9/2009 | Ghosh et al. .................. 711/130 |
| 2009/0231445 | A1 | 9/2009 | Kanehiro |
| 2009/0231449 | A1 | 9/2009 | Tzur et al. |
| 2009/0231468 | A1 | 9/2009 | Yasuda |
| 2009/0244301 | A1 | 10/2009 | Border et al. |
| 2009/0268963 | A1 | 10/2009 | Kang et al. |
| 2009/0274387 | A1 | 11/2009 | Jin |
| 2009/0322901 | A1 | 12/2009 | Subbotin et al. |
| 2010/0103194 | A1 | 4/2010 | Chen et al. |
| 2010/0150473 | A1 | 6/2010 | Kwon et al. |
| 2010/0157078 | A1 | 6/2010 | Atanassov et al. |
| 2010/0165075 | A1 | 7/2010 | Chou et al. |
| 2010/0166337 | A1 | 7/2010 | Murashita et al. |
| 2010/0321539 | A1 | 12/2010 | Ito |
| 2010/0328490 | A1 | 12/2010 | Kurane et al. |
| 2010/0328491 | A1 | 12/2010 | Ovsiannikov |
| 2011/0047155 | A1 | 2/2011 | Sohn et al. |
| 2011/0085697 | A1 | 4/2011 | Clippard et al. |
| 2011/0149111 | A1 | 6/2011 | Prentice et al. |
| 2011/0200265 | A1 | 8/2011 | Prigent |
| 2011/0228993 | A1 | 9/2011 | Reilly et al. |
| 2011/0254976 | A1 | 10/2011 | Garten |
| 2011/0279706 | A1 | 11/2011 | Lesiak et al. |
| 2012/0002082 | A1 | 1/2012 | Johnson et al. |
| 2012/0002898 | A1 | 1/2012 | Cote et al. |
| 2012/0002899 | A1 | 1/2012 | Orr, IV et al. |
| 2012/0044381 | A1 | 2/2012 | Jannard et al. |
| 2012/0105681 | A1 | 5/2012 | Morales |
| 2012/0127348 | A1 | 5/2012 | Li |
| 2012/0189197 | A1* | 7/2012 | Li et al. .......................... 382/165 |
| 2012/0201426 | A1 | 8/2012 | Jasinski et al. |
| 2012/0201450 | A1 | 8/2012 | Bryant et al. |
| 2012/0201456 | A1 | 8/2012 | El-Mahdy et al. |
| 2012/0219235 | A1 | 8/2012 | Solhusvik et al. |
| 2012/0249828 | A1 | 10/2012 | Sun |
| 2012/0314100 | A1 | 12/2012 | Frank |
| 2013/0033616 | A1 | 2/2013 | Kaizu et al. |
| 2013/0083216 | A1 | 4/2013 | Jiang et al. |
| 2013/0100314 | A1 | 4/2013 | Li et al. |
| 2014/0042233 | A1* | 2/2014 | Yang ............................. 235/494 |
| 2014/0219578 | A1 | 8/2014 | Peng et al. |

FOREIGN PATENT DOCUMENTS

| | | | |
|---|---|---|---|
| KR | 10-2007-0085867 | 8/2007 | |
| KR | 10-0911814 | 8/2009 | |
| KR | 10-2010-0086987 | 8/2010 | |
| KR | 10-2011-0074161 | * 8/2012 | ............... G06K 9/18 |
| WO | 98/02844 | 1/1998 | |
| WO | 2004/098167 | 11/2004 | |
| WO | 2011/093994 | 8/2011 | |
| WO | 2011/102850 | 8/2011 | |
| WO | 2012/027290 | 3/2012 | |
| WO | 2012/039669 | 3/2012 | |
| WO | 2012/061261 | 5/2012 | |
| WO | 2012/098842 | 7/2012 | |
| WO | 2012/110894 | 8/2012 | |

OTHER PUBLICATIONS

Jin et al, "Face Detection Using Improved LBP Under Bayesian Framework," 2004, Proceedings of the Third International Conference on Image and Graphics (ICIG'04), pp. 1-4.*

International Search Report and Written Opinion for PCT/US2014/011498 mailed Apr. 22, 2014, 11 pages.

Final Office Action, U.S. Appl. No. 13/863,981 mailed Apr. 8, 2014, 26 pages.

Office Action, U.S. Appl. No. 13/713,720, mailed Apr. 8, 2014, 46 pages.

Office Action for U.S. Appl. No. 13/863,981 mailed Oct. 7, 2013, 45 pages.

Notice of Allowance for U.S. Appl. No. 13/305,389 mailed Feb. 22, 2012, 9 pages.

Notice of Allowance for U.S. Appl. No. 13/458,334 mailed Oct. 11, 2012, 34 pages.

Notice of Allowance for U.S. Appl. No. 13/610,288 mailed Feb. 28, 2013, 31 pages.

Nayar et al., "Adaptive Dynamic Range Imaging: Optical Control of Pixel Exposures Over Space and Time," Proceedings of the Ninth IEEE International Conference on Computer Vision (ICCV'03), 2003, pp. 1-8.

Duan et al., "Tone-mapping High Dynamic Range Images by Novel Histogram Adjustment," Pattern Recognition, 2010, 39 pages, vol. 43, No. 5.

"Exposure (photography)," Wikipedia, the free encyclopedia, Jun. 21, 2012, pp. 1-8 (http://en.wikipedia.org/wiki/Autoexposure#Automatic_exposure).

"JPEG," Wikipedia, the free encyclopedia, Jul. 31, 2012, pp. 1-16 (http://en.wikipedia.org/wiki/JPEG).

"High dynamic range imaging," Wikipedia, the free encyclopedia, Jun. 21, 2012, pp. 1-11 (http://en.wikipedia.org/wiki/High_dynamic_range_imaging).

"Tone mapping," Wikipedia, the free encyclopedia, Jun. 21, 2012, pp. 1-10 (http://en.wikipedia.org/wiki/Tone_mapping).

"Metering mode," Wikipedia, the free encyclopedia, Jun. 25, 2012, pp. 1-3 (http://en.wikipedia.org/wiki/Metering_mode).

"YCbCr," Wikipedia, the free encyclopedia, Jul. 31, 2012, pp. 1-5 (http://en.wikipedia.org/wiki/YCbCr).

Lowe, D.G., "Object Recognition from Local Scale-Invariant Features," Proc. of the International Conference on Computer Vision, Sep. 20-22, 1999, pp. 1150-1157, vol. 2.

Brown, M. & Lowe, D., "Invariant Features from Interest Point Groups," Computer, (2002) p. 253-262, Available at: http://citeseerx.ist.psu.edu/viewdoc/download?doi=10.1.1.73.5616&rep=rep1&type=pdf.

Winder, S.A.J. and Brown, M., "Learning Local Image Descriptors," Computer Vision and Pattern Recognition, 2007. CVPR '07. IEEE Conference on in Computer Vision and Pattern Recognition, 2007. CVPR '07. IEEE Conference on (Jun. 2007), pp. 1-8. doi:10.1109/CVPR.2007.382971 Key: citeulike:1663569.

Sinha et al., "Feature Tracking and Matching in Video Using Programmable Graphics Hardware," Machine Vision and Applications, DOI 10.1007/s00138-007-0105-z, Nov. 2007.

Wagner et al., "Pose Tracking from Natural Features on Mobile Phones," Proceeding ISMAR '08 Proceedings of the 7th IEEE/ACM

(56) References Cited

OTHER PUBLICATIONS

International Symposium on Mixed and Augmented Reality IEEE Computer Society Washington, DC, USA, Sep. 15-18, 2008, pp. 125-134.
Özuysal et al., "Fast Keypoint Recognition in Ten Lines of Code," Computer Vision and Pattern Recognition, IEEE Computer Society Conference on in Computer Vision and Pattern Recognition, 2007. CVPR '07. IEEE Conference on, vol. 0 (2007), pp. 1-8. doi:10.1109/CVPR.2007.383123 Key: citeulike:2943111.
Bay et al., "SURF: Speeded Up Robust Features," 9th European Conference on Computer Vision, 2008, pp. 346-359, vol. 110, No. 3.
Ta, Duy-Nguyen et al., "SURFTrac: Efficient Tracking and Continuous Object Recognition using Local Feature Descriptors," IEEE Computer Society Conference on Computer Vision and Pattern Recognition, 2009, pp. 2937-2944.
Bauer et al., "Comparing Several Implementations of Two Recently Published Feature Detectors," In Proc. of the International Conference on Intelligent and Autonomous Systems, IAV, Toulouse, France (2007).
Sift, accessed on Oct. 21, 2011, from Wikipedia, http://en.wikipedia.org/w/index.php?title=Special: Book&bookcmd=download&collection_id=1bf75abdad524091&writer=rl&return_to=Scale-invariant+feature+transform.
SURF, accessed on Oct. 24, 2011, from Wikipedia, http://en.wikipedia.org/wiki/SURF.
Wagner et al., "Real-time detection and tracking for augmented reality on mobile phones," IEEE Trans Vis Comput Graph, May-Jun. 2010, pp. 355-368, Vol. 16, No. 3.
SynthCam iPhone, https://sites.google.com/site/marclevoy/Tutorial accessed Oct. 24, 2011.
Karpenko et al., "Digital Video Stabilization and Rolling Shutter Correction using Gyroscopes," Stanford Tech Report CTSR 2011-03, http://graphics.stanford.edu/papers/stabilization/karpenko_gyro.pdf (Sep. 2011).
Gelfand, Natasha, et al. "Multi-exposure imaging on mobile devices." In Proceedings of the international conference on Multimedia, ACM, 2010, pp. 823-826.
Cyganek, Boguslaw, "Comparison of nonparametric transformations and bit vector matching for stereo correlation." Combinatorial Image Analysis, 2005, pp. 534-547.
Zabih et al., "Non-parametric Local Transforms for Computing Visual Correspondence," In Proceedings of European Conference on Computer Vision, Stockholm, Sweden, May 1994, pp. 151-158.
Fife, Wade S. et al., "Improved Census Transforms for Resource-Optimized Stereo Vision," IEEE Transactions on Circuits and Systems for Video Technology, Jan. 2013, vol. 23, No. 1, pp. 60-73.
Hansen, Christian et al., "Chapter 1: The Image Deblurring Problem," Deblurring Images: Matrices, Spectra, and Filtering, SIAM, Philadelphia, 2006, pp. 1-12.
Seemann, Torsten et al., "Structure preserving noise filtering of images using explicit local segmentation." Fourteenth International Conference on Pattern Recognition, IEEE, 1998, vol. 2, pp. 1610-1612.
International Searching Authority, International Search Report and Written Opinion for PCT/US2013/071618 mailed Mar. 3, 2014, 9 pages.
International Searching Authority, International Search Report and Written Opinion for PCT/US2013/072569 mailed Mar. 6, 2014, 9 pages.
International Searching Authority, International Search Report and Written Opinion for PCT/US2013/072638 mailed Mar. 11, 2014, 10 pages.
International Searching Authority, International Search Report and Written Opinion for PCT/US2013/071663 mailed Mar. 13, 2014, 9 pages.
International Searching Authority, International Search Report and Written Opinion for PCT/US2013/72564 mailed Mar. 11, 2014, 13 pages.
International Searching Authority, International Search Report and Written Opinion for PCT/US2013/071459 mailed Mar. 13, 2014, 9 pages.
Office Action for U.S. Appl. No. 13/849,824 mailed Nov. 5, 2014, 14 pages.
International Searching Authority, International Search Report and Written Opinion for International Application No. PCT/US2014/038963 mailed Sep. 17, 2014, 12 pages.
Office Action for U.S. Appl. No. 13/718,533 mailed Apr. 22, 2014, 48 pages.
Office Action for U.S. Appl. No. 13/863,981 mailed Jun. 24, 2014, 23 pages.
Notice of Allowance for U.S. Appl. No. 13/718,533 mailed Jul. 18, 2014, 9 pages.
Notice of Allowance for U.S. Appl. No. 13/713,720 mailed Jul. 18, 2014, 13 pages.
Office Action for U.S. Appl. No. 13/759,749 mailed Sep. 24, 2014, 38 pages.
Office Action for U.S. Appl. No. 13/722,519 mailed Sep. 4, 2014, 10 pages.

* cited by examiner

FIG. 4B

STRUCTURE DESCRIPTOR — 306

| 1 | 0 | 1 |
|---|---|---|
| 0 | 0 | 0 |
| 0 | 1 | 0 |

NUMBER OF IDENTICAL CONTIGUOUS PAIRS = 5 — 404

| 0 | ×  1  × | 0 |
|---|---|---|
| 0 × | × 0 × | 0 |
| 0 | 1 | 0 |

SIZE OF LEAST CONNECTED COMPONENT = 1 — 406

| 1 | 0 | 1 |
|---|---|---|
| 0 | 0 | 0 |
| 0 | 1 | 0 |

STRUCTURE DESCRIPTORS FOR IMAGE PROCESSING

BACKGROUND

Existing image processing techniques attempt to account for structure in images by analyzing relatively large sections of the images. As a result, these techniques are computationally intensive, and are often inappropriate for applications that have access to limited computational resources (e.g., mobile applications). Furthermore, existing image processing techniques typically do not enforce the preservation of image structure, so the processing they apply can lead to objectionable changes in image structure between the input and output images.

SUMMARY

The structure of a section of a digital image may be evaluated. Based on the evaluation, a structure descriptor for the section may be determined. The structure descriptor may represent relationships between one or more pixels or groups of pixels in the section. Based on the structure descriptor, image processing may be applied to the image.

In a first example embodiment, a structure descriptor for an m×n pixel block of an image may be determined. The m×n pixel block may contain a primary pixel having a primary pixel value and a plurality of secondary pixels having respective secondary pixel values. The structure descriptor may include a plurality of structure indicators each associated with a respective secondary pixel. Each respective structure indicator may be based on the primary pixel value and the respective secondary pixel value of its associated secondary pixel. Based on the structure descriptor, a structure value for the m×n pixel block may be determined. Based on the structure value, image processing may be applied to the m×n pixel block.

A second example embodiment may include means for determining a structure descriptor for an m×n pixel block of an image, wherein the m×n pixel block contains a primary pixel having a primary pixel value and a plurality of secondary pixels having respective secondary pixel values, wherein the structure descriptor includes a plurality of structure indicators each associated with a respective secondary pixel, and wherein each respective structure indicator is based on the primary pixel value and the respective secondary pixel value of its associated secondary pixel. The second example embodiment may also include means for determining a structure value for the m×n pixel block based on the structure descriptor, and means for applying image processing to the m×n pixel block based on the structure value.

A third example embodiment may include a non-transitory computer-readable storage medium, having stored thereon program instructions that, upon execution by a computing device, cause the computing device, and/or its peripherals, to perform operations in accordance with the first and/or second example embodiments.

A fourth example embodiment may include a computing device, comprising at least a processor, an image sensor, and data storage. The data storage may contain program instructions that, upon execution by the processor, cause the computing device operate in accordance with the first and/or second example embodiments.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE FIGURES

FIG. 4B also depicts structure values derived from structure descriptors, in accordance with an example embodiment.

DETAILED DESCRIPTION

The structure of digital images may refer to representations of lines, edges, and/or transitions between objects represented in the images. For instance, a digital image of a black and white chess board may represent many edges between the black and white squares on the chessboard. These edges may be considered to be part of the structure of the image. Accordingly, such a black and white chess board may exhibit more structure than a random assortment of black and white pixels.

When using image processing techniques, such as de-noising, sharpening, and de-blurring, one possible challenge is distinguishing between structure and random noise in an image. Having this ability may allow the manipulation of images without introducing undesirable artifacts, such as a dark-bright edge that gets reversed to become a bright-dark edge, or an edge that gets blurred or lost entirely.

As one example of such artifacts, image sharpening techniques can lead to random noise being exaggerated and can even introduce unnatural "ringing" artifacts around edges. As another example, image de-noising techniques can cause the loss of fine image detail by removing a significant amount of structure that would be present in the ideal noise-free image. In both cases, better understanding of local structure, which helps separate structure from noise, can improve the quality of processed images and avoid the at least some objectionable artifacts.

As noted above, existing image processing techniques may be unsuitable for mobile applications. In particular, mobile applications may have limited access to computational resources (e.g., processing and/or storage resources). Further, it may be desirable for mobile applications to limit their use of available computational resources, so that the battery life of mobile devices can be conserved. Thus, it is desirable for de-noising, sharpening, and de-blurring techniques to effectively differentiate between image structure and noise, but to do so in a computationally efficient fashion.

Figure 1:
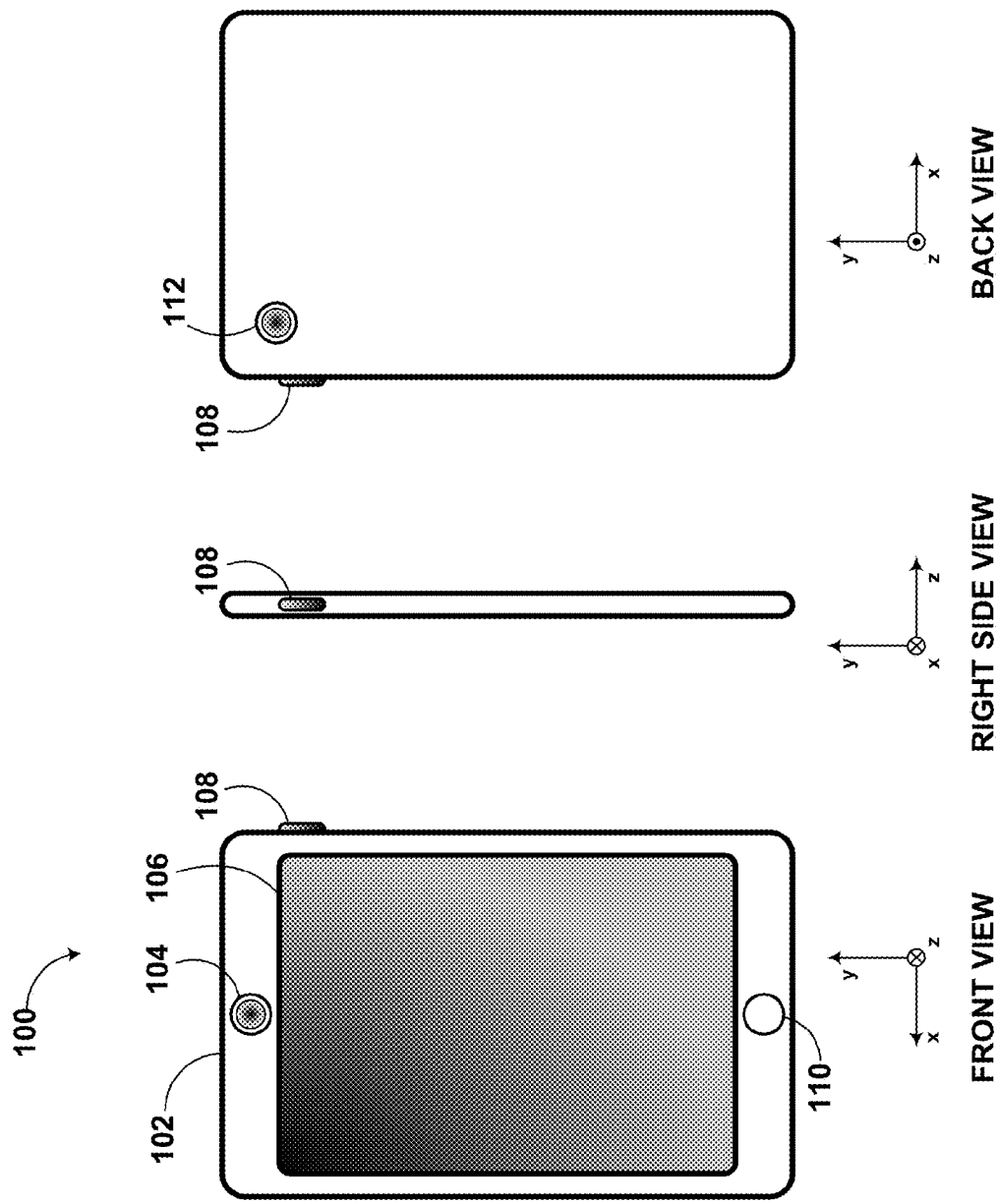
FIG. 1 depicts front, right side, and rear views of a digital camera device, in accordance with an example embodiment.
Figure 2:
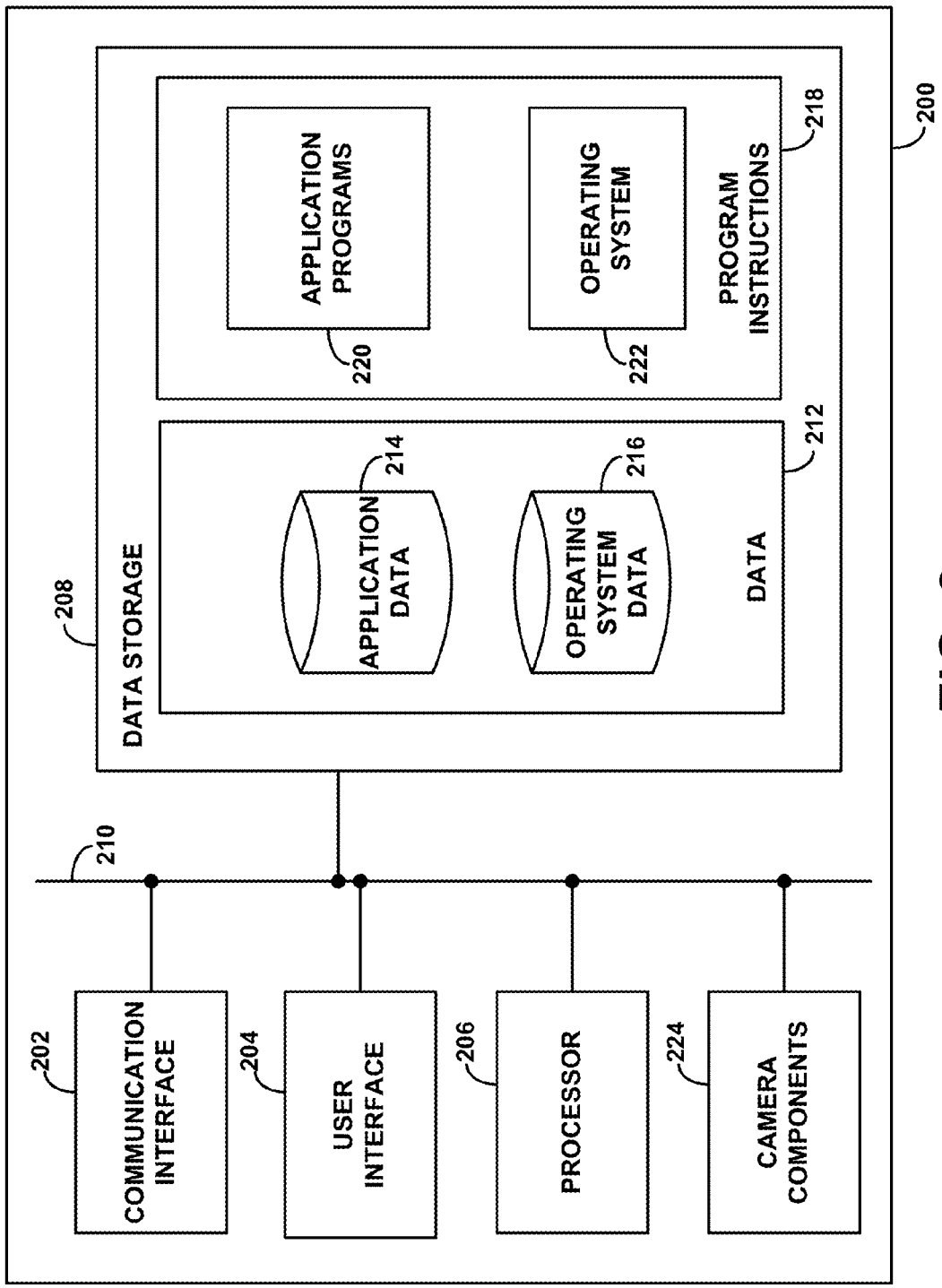
FIG. 2 depicts a block diagram of a computing device with image capture capability, in accordance with an example embodiment.

Accordingly, the embodiments herein may operate on image capture devices, such as the digital camera devices illustrated in FIGS. 1 and 2. However, these embodiments may also operate on other types of computing devices, including computing devices without image capture capabilities. Thus, a digital camera device may capture an image and process that image in accordance with the embodiments herein. Alternatively or additionally, a digital camera device may capture an image, the image may be transmitted or transferred to another computing device, and that computing device may process the image in accordance with the embodiments herein.

In the following, image capture devices and computing devices will be described in detail, and then image processing techniques that can operate efficiently on such devices will be presented.

Image capture devices, such as cameras, may be employed as standalone hardware devices or integrated into various other types of devices. For instance, still and video cameras are now regularly included in wireless communication devices (e.g., mobile phones), tablet computers, laptop computers, video game interfaces, home automation devices, and even automobiles and other types of vehicles.

The physical components of a camera may include an aperture through which light enters, a recording surface for capturing the image represented by the light, and a lens positioned in front of the aperture to focus at least part of the image on the recording surface. The aperture may be fixed size or adjustable. In an analog camera, the recording surface may be photographic film. In a digital camera, the recording surface may include an electronic image sensor (e.g., a charge coupled device (CCD) or a complementary metal-oxide-semiconductor (CMOS) sensor) to transfer and/or store captured images in a data storage unit (e.g., memory).

A shutter may be coupled to or nearby the lens or the recording surface. The shutter may either be in a closed position, in which it blocks light from reaching the recording surface, or an open position, in which light is allowed to reach to recording surface. The position of the shutter may be controlled by a shutter button. For instance, the shutter may be in the closed position by default. When the shutter button is triggered (e.g., pressed), the shutter may change from the closed position to the open position for a period of time, known as the shutter cycle. During the shutter cycle, an image may be captured on the recording surface. At the end of the shutter cycle, the shutter may change back to the closed position.

Alternatively, the shuttering process may be electronic. For example, before an electronic shutter of a CCD image sensor is "opened" the sensor may be reset to remove any residual signal in its photodiodes. While the electronic shutter remains open, the photodiodes may accumulate charge. When or after the shutter closes, these charges may be transferred to longer-term data storage. Combinations of mechanical and electronic shuttering may also be possible.

Regardless of type, a shutter may be activated and/or controlled by something other than a shutter button. For instance, the shutter may be activated by a softkey, a timer, or some other trigger. Herein, the term "image capture" may refer to any mechanical and/or electronic shuttering process that results in one or more photographs being recorded, regardless of how the shuttering process is triggered or controlled.

The exposure of a captured image may be determined by a combination of the size of the aperture, the brightness of the light entering the aperture, and the length of the shutter cycle (also referred to as the shutter length or the exposure length). Additionally, a digital or analog gain may be applied to the image, thereby influencing the exposure. In some embodiments, the term "total exposure length" or "total exposure time" may refer to the shutter length multiplied by the gain for a particular aperture size. Herein, the term "total exposure time," or "TET," should be interpreted as possibly being a shutter length, an exposure time, or any other metric that controls the amount of signal response that results from light reaching the recording surface.

A still camera may capture one or more images each time image capture is triggered. A video camera may continuously capture images at a particular rate (e.g., 24 images—or frames—per second) as long as image capture remains triggered (e.g., while the shutter button is held down). Some digital still cameras may open the shutter when the camera device or application is activated, and the shutter may remain in this position until the camera device or application is deactivated. While the shutter is open, the camera device or application may capture and display a representation of a scene on a viewfinder. When image capture is triggered, one or more distinct digital images of the current scene may be captured.

Cameras—even analog cameras—may include software to control one or more camera functions and/or settings, such as aperture size, TET, gain, and so on. Additionally, some cameras may include software that digitally processes images during or after these images are captured. While it should be understood that the description above refers to cameras in general, it may be particularly relevant to digital cameras.

As noted previously, digital cameras may be standalone devices or integrated with other devices. As an example, FIG. 1 illustrates the form factor of a digital camera device 100. Digital camera device 100 may be, for example, a mobile phone, a tablet computer, or a wearable computing device. However, other embodiments are possible. Digital camera device 100 may include various elements, such as a body 102, a front-facing camera 104, a multi-element display 106, a shutter button 108, and other buttons 110. Digital camera device 100 could further include a rear-facing camera 112. Front-facing camera 104 may be positioned on a side of body 102 typically facing a user while in operation, or on the same side as multi-element display 106. Rear-facing camera 112 may be positioned on a side of body 102 opposite front-facing camera 104. Referring to the cameras as front and rear facing is arbitrary, and digital camera device 100 may include multiple cameras positioned on various sides of body 102.

Multi-element display 106 could represent a cathode ray tube (CRT) display, a light emitting diode (LED) display, a liquid crystal (LCD) display, a plasma display, or any other type of display known in the art. In some embodiments, multi-element display 106 may display a digital representation of the current image being captured by front-facing camera 104 and/or rear-facing camera 112, or an image that could be captured or was recently captured by either or both of these cameras. Thus, multi-element display 106 may serve as a viewfinder for either camera. Multi-element display 106 may also support touchscreen and/or presence-sensitive functions that may be able to adjust the settings and/or configuration of any aspect of digital camera device 100.

Front-facing camera 104 may include an image sensor and associated optical elements such as lenses. Front-facing camera 104 may offer zoom capabilities or could have a fixed focal length. In other embodiments, interchangeable lenses could be used with front-facing camera 104. Front-facing camera 104 may have a variable mechanical aperture and a mechanical and/or electronic shutter. Front-facing camera 104 also could be configured to capture still images, video images, or both. Further, front-facing camera 104 could represent a monoscopic, stereoscopic, or multiscopic camera. Rear-facing camera 112 may be similarly or differently arranged. Additionally, front-facing camera 104, rear-facing camera 112, or both, may be an array of one or more cameras.

Either or both of front facing camera 104 and rear-facing camera 112 may include or be associated with an illumination component that provides a light field to illuminate a target object. For instance, an illumination component could provide flash or constant illumination of the target object. An illumination component could also be configured to provide a light field that includes one or more of structured light, polarized light, and light with specific spectral content. Other types of light fields known and used to recover three-dimensional (3D) models from an object are possible within the context of the embodiments herein.

Either or both of front facing camera 104 and rear-facing camera 112 may include or be associated with an ambient light sensor that may continuously or from time to time determine the ambient brightness of a scene that the camera can capture. In some devices, the ambient light sensor can be used to adjust the display brightness of a screen associated with the camera (e.g., a viewfinder). When the determined ambient brightness is high, the brightness level of the screen may be increased to make the screen easier to view. When the determined ambient brightness is low, the brightness level of the screen may be decreased, also to make the screen easier to view as well as to potentially save power. Additionally, the ambient light sensor's input may be used to determine a TET of an associated camera, or to help in this determination.

Digital camera device 100 could be configured to use multi-element display 106 and either front-facing camera 104 or rear-facing camera 112 to capture images of a target object. The captured images could be a plurality of still images or a video stream. The image capture could be triggered by activating shutter button 108, pressing a softkey on multi-element display 106, or by some other mechanism. Depending upon the implementation, the images could be captured automatically at a specific time interval, for example, upon pressing shutter button 108, upon appropriate lighting conditions of the target object, upon moving digital camera device 100 a predetermined distance, or according to a predetermined capture schedule.

As noted above, the functions of digital camera device 100—or another type of digital camera—may be integrated into a computing device, such as a wireless communication device, tablet computer, laptop computer and so on. For purposes of example, FIG. 2 is a simplified block diagram showing some of the components of an example computing device 200 that may include camera components 224.

By way of example and without limitation, computing device 200 may be a cellular mobile telephone (e.g., a smartphone), a still camera, a video camera, a fax machine, a computer (such as a desktop, notebook, tablet, or handheld computer), a personal digital assistant (PDA), a home automation component, a digital video recorder (DVR), a digital television, a remote control, a wearable computing device, or some other type of device equipped with at least some image capture and/or image processing capabilities. It should be understood that computing device 200 may represent a physical camera device such as a digital camera, a particular physical hardware platform on which a camera application operates in software, or other combinations of hardware and software that are configured to carry out camera functions.

As shown in FIG. 2, computing device 200 may include a communication interface 202, a user interface 204, a processor 206, data storage 208, and camera components 224, all of which may be communicatively linked together by a system bus, network, or other connection mechanism 210.

Communication interface 202 may function to allow computing device 200 to communicate, using analog or digital modulation, with other devices, access networks, and/or transport networks. Thus, communication interface 202 may facilitate circuit-switched and/or packet-switched communication, such as plain old telephone service (POTS) communication and/or Internet protocol (IP) or other packetized communication. For instance, communication interface 202 may include a chipset and antenna arranged for wireless communication with a radio access network or an access point. Also, communication interface 202 may take the form of or include a wireline interface, such as an Ethernet, Universal Serial Bus (USB), or High-Definition Multimedia Interface (HDMI) port. Communication interface 202 may also take the form of or include a wireless interface, such as a Wifi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 202. Furthermore, communication interface 202 may comprise multiple physical communication interfaces (e.g., a Wifi interface, a BLUETOOTH® interface, and a wide-area wireless interface).

User interface 204 may function to allow computing device 200 to interact with a human or non-human user, such as to receive input from a user and to provide output to the user. Thus, user interface 204 may include input components such as a keypad, keyboard, touch-sensitive or presence-sensitive panel, computer mouse, trackball, joystick, microphone, and so on. User interface 204 may also include one or more output components such as a display screen which, for example, may be combined with a presence-sensitive panel. The display screen may be based on CRT, LCD, and/or LED technologies, or other technologies now known or later developed. User interface 204 may also be configured to generate audible output(s), via a speaker, speaker jack, audio output port, audio output device, earphones, and/or other similar devices.

In some embodiments, user interface 204 may include a display that serves as a viewfinder for still camera and/or video camera functions supported by computing device 200. Additionally, user interface 204 may include one or more buttons, switches, knobs, and/or dials that facilitate the configuration and focusing of a camera function and the capturing of images (e.g., capturing a picture). It may be possible that some or all of these buttons, switches, knobs, and/or dials are implemented as functions on a presence-sensitive panel.

Processor 206 may comprise one or more general purpose processors—e.g., microprocessors—and/or one or more special purpose processors—e.g., digital signal processors (DSPs), graphics processing units (GPUs), floating point units (FPUs), network processors, or application-specific integrated circuits (ASICs). In some instances, special purpose processors may be capable of image processing, image alignment, and merging images, among other possibilities. Data storage 208 may include one or more volatile and/or non-volatile storage components, such as magnetic, optical, flash, or organic storage, and may be integrated in whole or in part with processor 206. Data storage 208 may include removable and/or non-removable components.

Processor 206 may be capable of executing program instructions 218 (e.g., compiled or non-compiled program logic and/or machine code) stored in data storage 208 to carry out the various functions described herein. Therefore, data storage 208 may include a non-transitory computer-readable medium, having stored thereon program instructions that, upon execution by computing device 200, cause computing device 200 to carry out any of the methods, processes, or functions disclosed in this specification and/or the accompanying drawings. The execution of program instructions 218 by processor 206 may result in processor 206 using data 212.

By way of example, program instructions 218 may include an operating system 222 (e.g., an operating system kernel, device driver(s), and/or other modules) and one or more application programs 220 (e.g., camera functions, address book, email, web browsing, social networking, and/or gaming applications) installed on computing device 200. Similarly, data 212 may include operating system data 216 and application data 214. Operating system data 216 may be accessible primarily to operating system 222, and application data 214 may be accessible primarily to one or more of application programs 220. Application data 214 may be arranged in a file system that is visible to or hidden from a user of computing device 200.

Application programs 220 may communicate with operating system 222 through one or more application programming interfaces (APIs). These APIs may facilitate, for instance, application programs 220 reading and/or writing application data 214, transmitting or receiving information via communication interface 202, receiving and/or displaying information on user interface 204, and so on.

In some vernaculars, application programs 220 may be referred to as "apps" for short. Additionally, application programs 220 may be downloadable to computing device 200 through one or more online application stores or application markets. However, application programs can also be installed on computing device 200 in other ways, such as via a web browser or through a physical interface (e.g., a USB port) on computing device 200.

Camera components 224 may include, but are not limited to, an aperture, shutter, recording surface (e.g., photographic film and/or an image sensor), lens, and/or shutter button. Camera components 224 may be controlled at least in part by software executed by processor 206. However, it should be understood that the embodiments herein can operate on computing devices that do not include camera components. For instance, variations of computing device 200 without camera components 224 may represent personal computing devices (e.g., desktop personal computer, laptop, tablet, and/or server devices).

Captured digital images may be represented as a one-dimensional, two-dimensional, or multi-dimensional array of pixels. Each pixel may be represented by one or more values that may encode the respective pixel's color and/or brightness. For example, one possible encoding uses the YCbCr color model. In this color model, the Y channel may represent the brightness of a pixel, and the Cb and Cr channels may represent the blue chrominance and red chrominance, respectively, of the pixel. For instance, each of these channels may take values from 0 to 255 (i.e., the tonal range that a single 8-bit byte can offer). Thus, the brightness of a pixel may be represented by a 0 or a value near zero if the pixel is black or close to black, and by a 255 or a value near 255 if the pixel is white or close to white. However, the value of 255 is a non-limiting reference point, and some implementations may use different maximum values (e.g., 1023, 4095, etc.).

Nonetheless, the YCbCr color model is just one possible color model, and other color models such as a red-green-blue (RGB) color model or a cyan-magenta-yellow-key (CMYK) may be employed with the embodiments herein. Further, the pixels in an image may be represented in various file formats, including raw (uncompressed) formats, or compressed formats such as Joint Photographic Experts Group (JPEG), Portable Network Graphics (PNG), Graphics Interchange Format (GIF), and so on.

Most, if not all, image capture devices introduce noise to images while capturing these images. Often, the introduced noise is Gaussian in nature. Thus, each pixel in the image may be changed from its original value by some amount, and across multiple pixels this amount can exhibit a Gaussian (normal) distribution. But other noise distributions are possible. For example, the noise at different pixels may be correlated. In addition to noise introduced by the image capture process, captured images of a scene may exhibit some degree of blurring due to improper focus, movement in the scene, and/or movement of the image capture device.

Both noise and blurring are undesirable in images, as they are aesthetically unpleasing to the human eye, and may obscure details of the image. Noise and blurring may particularly impact representations of lines, edges, and/or transitions between objects in the image. These representations of lines, edges, and/or transitions may be referred to as "structure," and some images may exhibit more structure than others.

In order to reduce the impact of noise and blurring, image processing techniques, such as de-noising, sharpening, and/or de-blurring may be employed. However, in order for these techniques to be effective, they may need to differentiate between structure and noise in an image. Without the ability to distinguish structure from noise, these techniques may introduce undesirable artifacts to images, such as dark-bright edges that gets reversed to become bright-dark edges, edges that gets blurred or lost entirely, and/or the exaggeration of noise in the images. Further, image processing techniques can cause the loss of fine image detail by removing structure that would be present in an ideal noise-free image.

As one example, consider an image of a black-and-white chess board. Ideally, the image should represent the transitions between the white and black squares as sharp, distinct lines. On one side of such a line all of the pixels should be white and on the other side of the line the pixels should be black. However, the noise introduced by an image capture device might distort this line by placing some amount of black pixels on the white side of the line and some amount of white pixels on the black side of the line. This may result in the line appearing blurred and/or the black and white sections appearing peppered with the other color. Alternatively or additionally, instead of all pixels being either black or white, the image capture device may represent some pixels along the line as gray, which may reduce the sharpness of the line.

To improve the quality of captured images, image processing techniques, such as de-noising, sharpening, and/or de-blurring may be employed. There are many de-noising, sharpening, and de-blurring techniques, any of which may potentially be used with the embodiments herein. Some of these techniques may be configurable to operate at different level of aggressiveness. For instance, a de-noising technique operating at a lower level of aggressiveness may apply a limited amount of de-noising to a captured image. However, the same de-noising technique operating at a higher level of aggressiveness may de-noise the captured image less conservatively. Thus, at the higher level of aggressiveness, the de-noising technique may perform more iterations of de-noising on the captured image and/or attempt to de-noise parts of the image that it would not when set at the lower level of aggressiveness.

A better understanding and representation of the local structure of images may improve the quality of processed images and avoid the creation of at least some undesirable artifacts. One way of considering local structure during image processing is to process an image in sections. For example, each section might be an m×n block of pixels. The size of the pixel block may be small, perhaps containing as few as 1-100 pixels. However, the pixel block might be larger than 100 pixels. In some cases m and n might take on the same value, resulting in a square pixel block.

By analyzing one or more pixel blocks of an image, the local structure represented by the pixel block may be differentiated from noise. Particularly, a structure descriptor containing a characterization of an associated pixel block may be determined. Image processing of the pixel block may be based, at least to some extent, on the pixel block's associated structure descriptor.

Figure 3A:
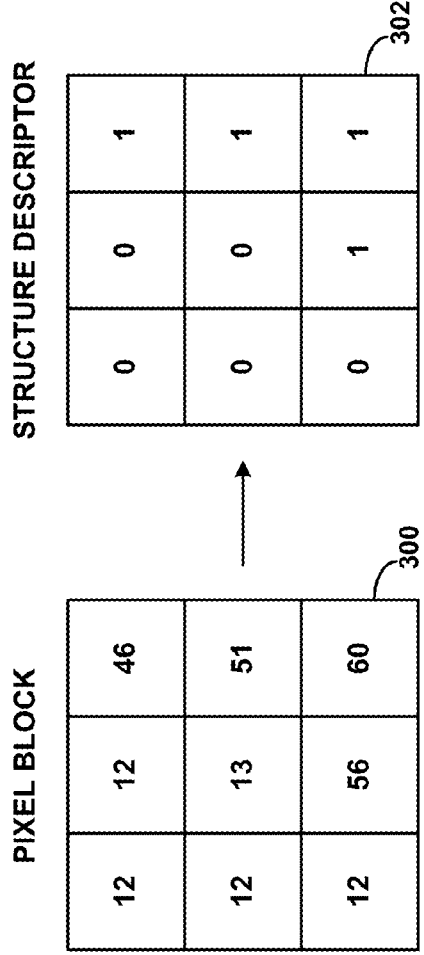
FIG. 3A depicts pixel blocks and structure descriptors, in accordance with an example embodiment.
Figure 3B:
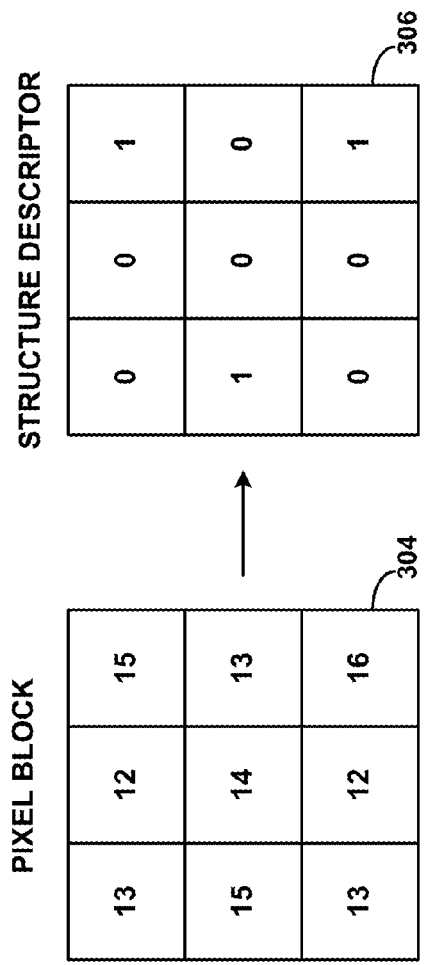
FIG. 3B also depicts pixel blocks and structure descriptors, in accordance with an example embodiment.

FIGS. 3A and 3B provide examples of pixel blocks and associated structure descriptors. For instance, pixel block 300 is a 3×3 pixel block containing various pixel values. Each of the pixel values in pixel block 300 may represent one or more color channels in the YCbCr, RGB, or CMYK color model, or may be based on some other color model. Thus each pixel value may represent a color, a brightness, or some combination of color and brightness. In some embodiments, each color channel of a given color model may be represented in a different pixel block and may be associated with a different structure descriptor.

To derive structure descriptor 302, the value of the center pixel of pixel block 300 may be compared to its neighbors. Each cell in structure descriptor 302 may take on a value of either 0 or 1 based on the outcome of this comparison. The value of a cell in structure descriptor 302 takes on a value of 0 if the value of its corresponding pixel in pixel block 300 is less than or equal to the value of the center pixel of pixel block 300, and 1 if the value of its corresponding pixel in pixel block 300 is greater than the value of the center pixel of pixel block 300.

Therefore, since the center pixel of pixel block 300 has a pixel value of 13, all pixels in pixel block 300 with pixel values of 13 or less are assigned a 0 in their associated cells of structure descriptor 302. On the other hand, all pixels in pixel block 300 with pixel values of 14 or more are assigned a 1 in their associated cells of structure descriptor 302. As depicted in FIG. 3A, the center pixel of pixel block 300 is surrounded by lower pixel values above and to the left, and by higher pixel values below and to the right. Thus, the pixels of FIG. 3A may represent an edge between two objects or colors. Structure descriptor 302 reflects this structure.

As depicted in FIG. 3B, structure descriptor 306 may be determined based on pixel block 304. Since the center pixel of pixel block 304 has a pixel value of 14, all pixels in pixel block 304 with pixel values of 14 or less are assigned a 0 in their associated cells of structure descriptor 306. Also, all pixels in pixel block 304 with pixel values of 15 or more are assigned a 1 in their associated cells of structure descriptor 306. The center pixel of pixel block 304 is surrounded by both lower and higher pixel values. Thus, the pixels of FIG. 3B may represent a noisy part of a scene. Structure descriptor 306 reflects this structure.

FIGS. 3A and 3B are provided for purposes of example, and other embodiments are possible. For instance, a pixel block that is larger than 3×3 (e.g., a 5×5, 7×7, or 9×9 pixel block) may be used. Further, while in FIGS. 3A and 3B the center pixel is used as a primary pixel to which all other pixels are compared, a non-center pixel may be used as the primary pixel instead. In full generality, each cell in a structure descriptor may represent any type of relation, formula, or manipulation of an arbitrary pair or group of pixels in a pixel block. Additionally, the cells of a structure descriptor may take on values other than just 0 and 1. For instance, the magnitude of a structure indicator may scale with the difference between the pixel values being compared.

In some embodiments, the structure descriptor may take the form of an 8-bit sequence (e.g., one byte), wherein each bit represents one of the non-center binary values. For instance, structure descriptor 302 may be represented as 00101011 (43 in decimal) and structure descriptor 306 may be represented as 00110001 (49 in decimal). In each of these representations, the center pixel of the pixel block is not included. For larger structure descriptors, more bits may be used. For instance, a 5×5 structure descriptor may be represented with a 3-byte (24-bit) value.

Regardless, there are several ways in which a structure value representing the structure of an m×n pixel block can be determined from an associated structure descriptor. In one technique, the number of contiguous vertical or horizontal 0-0 and 1-1 pairs in the structure descriptor may be determined. For a 3×3 pixel block, the result is a number between 0 and 12, where 0 indicates little or no structure and high noise, while 12 indicates high structure and little or no noise. Generally, the higher this value, the greater the amount of structure in the pixel block.

Figure 4A:
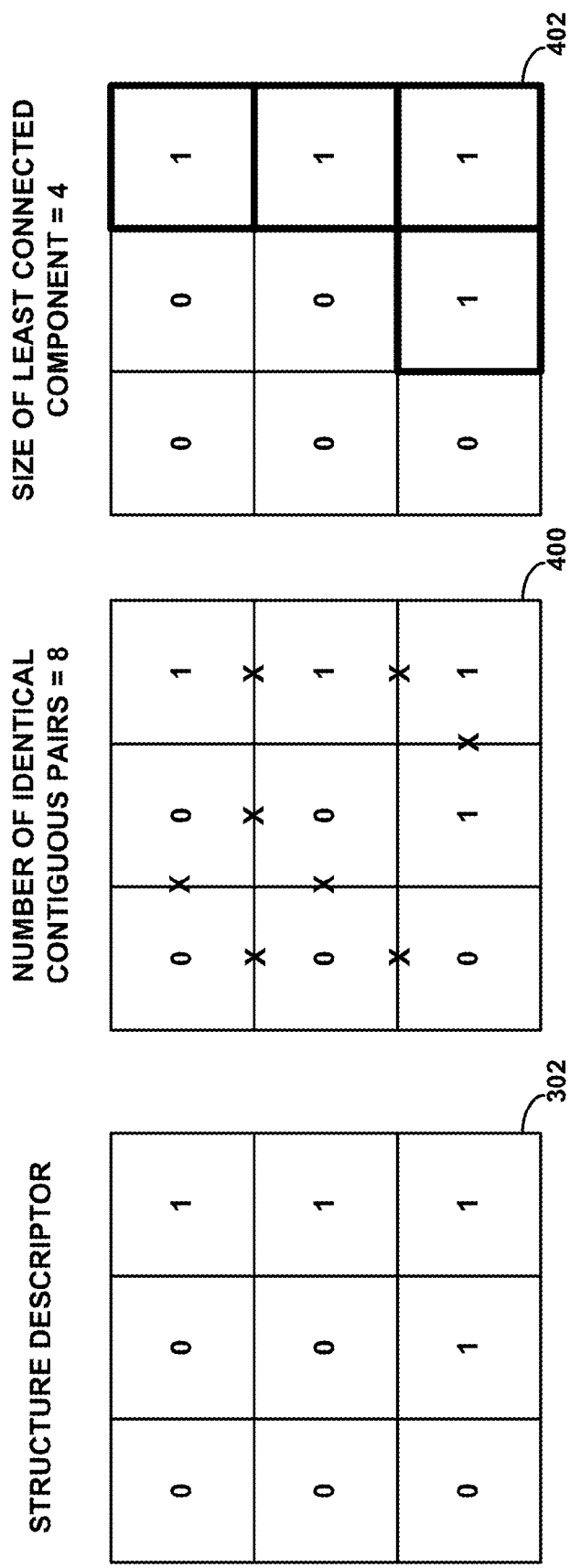
FIG. 4A depicts structure values derived from structure descriptors, in accordance with an example embodiment.

FIG. 4A depicts this technique applied to structure descriptor 302. Block 400 shows a 3×3 representation of structure descriptor 302 with X's marked where there is a contiguous vertical or horizontal 0-0 and 1-1 pair. In block 400, there are a total of 8 pairs. Therefore, the structure value determined by this technique for structure descriptor 302 is 8. Likewise, FIG. 4B depicts this technique applied to structure descriptor 306. Block 404 shows a 3×3 representation of structure descriptor 306 with X's marked where there is a contiguous vertical or horizontal 0-0 and 1-1 pair. In block 404, there are a total of 5 pairs. Therefore, the structure value determined by this technique for structure descriptor 306 is 5. Since 8 is greater than 5, the structure values for pixel block 300 and pixel block 304 indicate that pixel block 300 exhibits more structure and less noise than pixel block 304.

In another technique, the size of the least connected component of a structure descriptor may be determined. The least connected component may be defined as the smallest contiguous (e.g., vertically or horizontally adjacent) set of either 0's or 1's in the structure descriptor. For a 3×3 pixel block, the result is a number between 1 and 9, where 1 indicates less structure and 9 indicates more structure. Generally, the higher this value, the greater the amount of structure in the pixel block.

FIG. 4A also depicts this technique applied to structure descriptor 302. Block 402 shows a 3×3 representation of structure descriptor 302 with the least connected component identified with thicker cell edges. In block 402, the size of the least connected component is 4. Therefore, the structure value determined by this technique for structure descriptor 302 is 4. FIG. 4B also depicts this technique applied to structure descriptor 306. Block 406 shows a 3×3 representation of structure descriptor 306 with the least connected component identified with thicker cell edges. In block 406, the size of the least connected component is 1 (in fact, there are three least connected components of size 1). Therefore, the structure value determined by this technique for structure descriptor 306 is 1. Since 4 is greater than 1, the structure values for pixel block 300 and pixel block 304 also indicate that pixel block 300 exhibits more structure and less noise than pixel block 304.

In yet another technique, each possible value of the 8-bit representation of the structure descriptor (e.g., for a 3×3 pixel block these values may be between 0 and 255, inclusive) may be mapped to a structure value in a given range. For instance, suppose that the given range is 1 to 10, where a 1 indicates less structure and a 10 indicates more structure. Then, a structure descriptor of 0 may be mapped to a structure value of 10, a structure descriptor of 90 may be mapped to a structure value of 1, and so on. These mappings may be pre-determined or derived using some form of machine learning procedure.

Once a structure value is determined, it can be used during image de-noising and image sharpening. In image de-noising, pixel blocks with less structure may be de-noised more aggressively than those with more structure. In this way, fine image details may be preserved. In image sharpening, pixel blocks with more structure may be sharpened more than pixel blocks with less structure. In image de-blurring, pixel blocks with more structure may be de-blurred more than pixel blocks with less structure.

As an example of image sharpening, suppose that a pixel block contains an edge that is defined between a set of pixels with pixel values of 100 and an adjacent set of pixels with pixel values of 110. If the structure value indicates a low or medium degree of structure, the pixel values may be changed to 90 and 120, respectively. However, if the structure value indicates a high degree of structure, the pixel values may be changed to 80 and 130, respectively. Thus, contrast may be added between the two sets of pixels.

Additionally, the structure descriptor may be compared before and after image processing, to evaluate how well local structure is preserved by image processing, and to limit the introduction of artifacts. The "before" structure descriptor may be determined prior to applying image process to an pixel block, and the "after" structure descriptor may be determined after applying image processing to the pixel block. The difference between the "before" and "after" structure descriptors may be used to determine whether new structures have been created or original structures have been eliminated. This difference can be defined as the number of different bits in the "before" and "after" structure descriptors, or by some other calculation. In some implementations, this difference may be the Hamming distance between the "before" and "after" structure descriptors. For example, if the difference is large, it is very likely that image artifacts have been introduced by the image processing.

TABLE 1

| | |
|---|---|
| 1. | Given an image I, sharpen the image by convolving with a standard "unsharpen" mask, to get the intermediate image result I' |
| 2. | Determine D(I) and D(I'), the structure descriptors of I and I', respectively |
| 3. | Determine V(I), the structure value of D(I) |
| 4. | Use two principles below to merge I and I': |
| | a. As the difference between D(I) and D(I') grows, increase the weight of I |
| | b. As the structure value V(I) grows, increase the weight of I. |

The pseudo-code in Table 1 is an example of an image sharpening using structure descriptors. At line 1, an image I is sharpened by convolving it with an unsharpen mask formed from image I'. For instance, the unsharpen mask for I may be created by applying Gaussian noise to a I, and then comparing the result to I. If the difference is greater than a pre-defined threshold, the images are combined (e.g., subtracted) to form I'. The effect of this operation may be to emphasize high-frequency components of I.

At line 2, the structure descriptors of I and I', D(I) and D(I'), respectively, are determined. At line 3, V(I) the structure value of I, is determined. At line 4, I and I' are merged. As the difference between D(I) and D(I') grows, the weight given to I in the merging is increased. For instance, if the difference is above a threshold, more weight might be given to I and/or less weight might be given to I'. The weight given to I is also increased as V(I) grows.

It should be understood that Table 1 illustrates an example embodiment, and that other embodiments may be used instead. Some of these embodiments may encompass using de-noising and/or de-blurring techniques instead of or combined with the illustrated sharpening technique.

Figure 5:
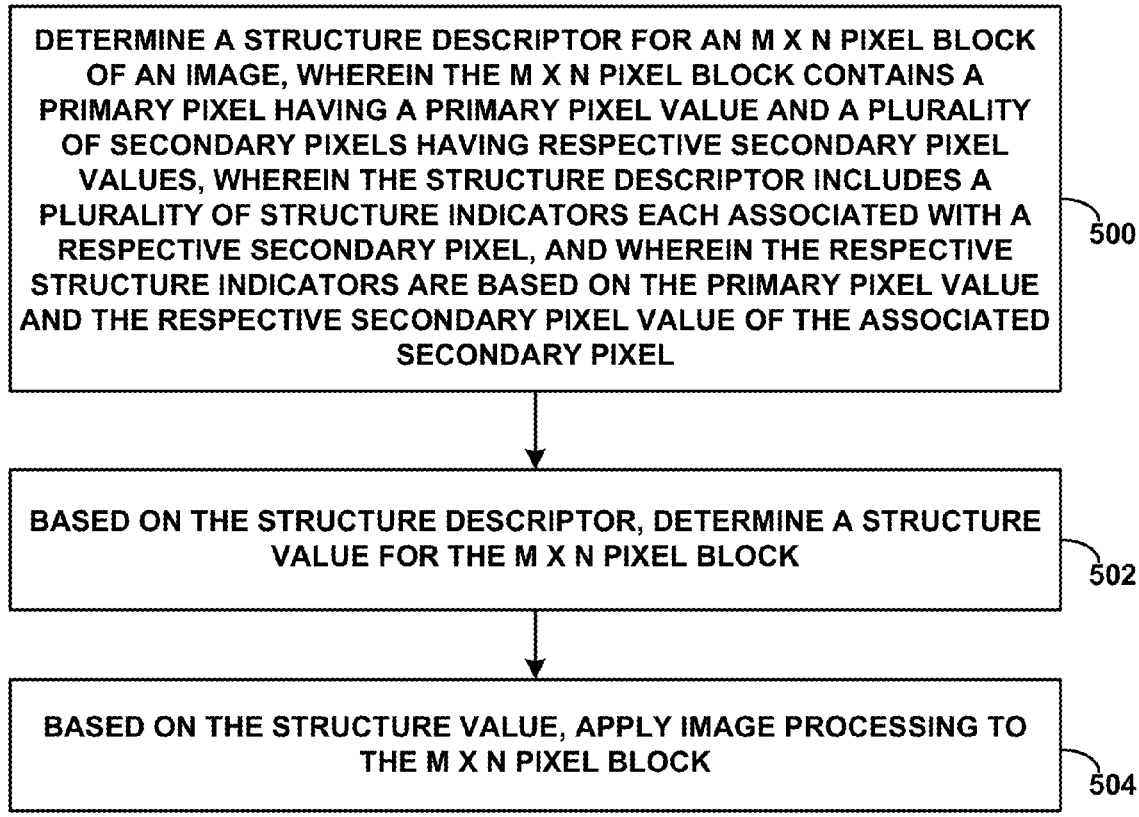
FIG. 5 depicts a flow chart, in accordance with an example embodiment.

FIG. 5 depicts a flow chart, in accordance with an example embodiment. At step 500, a structure descriptor for an m×n pixel block of an image may be determined. The m×n pixel block may contain a primary pixel having a primary pixel value and a plurality of secondary pixels having respective secondary pixel values. The structure descriptor may include a plurality of structure indicators each associated (e.g., pairwise associated) with a respective secondary pixel. The respective structure indicators may be based on the primary pixel value and the respective secondary pixel value of the associated secondary pixel.

At step 502, a structure value for the m×n pixel block may be determined based on the structure descriptor. At step 504, image processing may be applied to the m×n pixel block based on the structure descriptor.

In some embodiments, the structure descriptor may contain m×n structure indicators, one of which is associated with the primary pixel, and m×n−1 of which are the plurality of structure indicators.

Alternatively or additionally, determining the structure descriptor may involve setting a respective structure indicator for a secondary pixel to 0 if the secondary pixel has a secondary pixel value less than or equal to the primary pixel value. Determining the structure descriptor may also involve setting the respective structure indicator for the secondary pixel to 1 if the secondary pixel has a secondary pixel value greater than the primary pixel value.

In some embodiments, the structure descriptor may be an m×n block. Determining the structure value may involve calculating a number of 0-0 and 1-1 vertically adjacent or horizontally adjacent structure indicator pairs in the structure descriptor. In other embodiments, the structure descriptor may be an m×n block, and determining the structure value may involve calculating a size of a least connected component in the structure descriptor. The least connected component may be a smallest contiguous group of structure indicators in the structure descriptor with a common value. Alternatively, the structure descriptor may take on any form, and determining the structure value may involve mapping the structure descriptor to the structure value using a lookup table that associates structure descriptors to structure values.

In some cases, m=n, and/or m is an odd number. The primary pixel may be a center pixel of the m×n pixel block. As one possible example, m=3, and the structure descriptor is represented by an 8-bit sequence that includes the structure indicators associated with each secondary pixel of the m×n pixel block.

Applying image processing to the m×n pixel block may involve applying a first degree of de-noising if the structure value is less than or equal to a structure value threshold and/or applying a second degree of de-noising if the structure value is greater than the structure value threshold, wherein the first degree of de-noising involves more de-noising than the second degree of de-noising. Alternatively or additionally, applying image processing to the m×n pixel block may involve applying a first degree of sharpening if the structure value is greater than a structure value threshold, and/or applying a second degree of sharpening if the structure value is less than or equal to the structure value threshold, wherein the first degree of sharpening involves more sharpening than the second degree of sharpening.

In some embodiments, applying image processing to the m×n pixel block forms a second m×n pixel block of the image. Then, a second structure descriptor for the second m×n pixel block may be determined. Based on the second structure descriptor, a second structure value for the second m×n pixel block may be determined. Based on the structure value and the second structure value, the m×n pixel block and the second m×n pixel block may be merged. Merging the m×n pixel block and the second m×n pixel block may involve determining an absolute difference between the first structure value and the second structure value, determining that the absolute difference is greater than a threshold difference, and based on the absolute difference being greater than the threshold difference, assigning the m×n pixel block more weight than the second m×n pixel block during the merging. The absolute difference may be, for instance, the absolute value of the difference between the first structure value and the second structure value.

The steps depicted in FIG. 5 may be carried out by a camera device, such as digital camera device 100, a computing device, such as computing device 200, and/or by two or more distinct devices. Nonetheless, other arrangements are possible. Further, the flow chart depicted in FIG. 5 may be modified according to the variations disclosed in this specification and/or the accompanying drawings.

The above detailed description describes various features and functions of the disclosed systems, devices, and methods with reference to the accompanying figures. The illustrative embodiments described in the detailed description, figures, and claims are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block and/or communication may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache memory, and/or random access memory (RAM). The computer-readable media may also include non-transitory computer-readable media that store program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
determining, by a computing device, a structure descriptor for an m×n pixel block of an image, wherein the m×n pixel block contains a primary pixel having a primary pixel value and a plurality of secondary pixels having respective secondary pixel values, wherein the structure descriptor includes a plurality of structure indicators each associated with a respective secondary pixel, and wherein the respective structure indicators are based on the primary pixel value and the respective secondary pixel value of the associated secondary pixel;
based on the structure descriptor, determining a structure value for the m×n pixel block;
based on the structure value, applying image processing to the m×n pixel block to form a second m×n pixel block of the image;
determining a second structure descriptor for the second m×n pixel block;
based on the second structure descriptor, determining a second structure value for the second m×n pixel block; and
based on the structure value and the second structure value, merging the m×n pixel block and the second m×n pixel block, wherein merging the m×n pixel block and the second m×n pixel block comprises determining an absolute difference between the first structure value and the second structure value, determining that the absolute difference is greater than a threshold difference, and based on the absolute difference being greater than the threshold difference, assigning the m×n pixel block more weight than the second m×n pixel block during the merging.

2. The method of claim 1, wherein the structure descriptor contains m×n structure indicators, one of which is associated with the primary pixel, and m×n−1 of which are the plurality of structure indicators.

3. The method of claim 1, wherein determining the structure descriptor comprises:
setting the respective structure indicator for a secondary pixel to 0 if the secondary pixel has a secondary pixel value less than or equal to the primary pixel value; and
setting the respective structure indicator for the secondary pixel to 1 if the secondary pixel has a secondary pixel value greater than the primary pixel value.

4. The method of claim 3, wherein the structure descriptor is an m×n block, and wherein determining the structure value comprises calculating a number of 0-0 and 1-1 vertically adjacent or horizontally adjacent structure indicator pairs in the structure descriptor.

5. The method of claim 3, wherein the structure descriptor is an m×n block, and wherein determining the structure value comprises calculating a size of a least connected component in the structure descriptor, wherein the least connected component is a smallest contiguous group of structure indicators in the structure descriptor with a common value.

6. The method of claim 3, wherein m=n, m is an odd number, and the primary pixel is a center pixel of the m×n pixel block.

7. The method of claim 6, wherein m=3, and wherein the structure descriptor is represented by an 8-bit sequence that includes the structure indicators associated with each secondary pixel of the m×n pixel block.

8. The method of claim 1, wherein determining the structure value comprises mapping the structure descriptor to the structure value using a lookup table that associates structure descriptors to structure values.

9. The method of claim 1, wherein applying image processing to the m×n pixel block comprises:
applying a first degree of de-noising if the structure value is less than or equal to a structure value threshold; and
applying a second degree of de-noising if the structure value is greater than the structure value threshold, wherein the first degree of de-noising involves more de-noising than the second degree of de-noising.

10. The method of claim 1, wherein applying image processing to the m×n pixel block comprises:
applying a first degree of sharpening if the structure value is greater than a structure value threshold; and
applying a second degree of sharpening if the structure value is less than or equal to the structure value threshold, wherein the first degree of sharpening involves more sharpening than the second degree of sharpening.

11. An article of manufacture including a non-transitory computer-readable medium, having stored thereon program instructions that, upon execution by a computing device, cause the computing device to perform operations comprising:
determining a structure descriptor for an m×n pixel block of an image, wherein the m×n pixel block contains a primary pixel having a primary pixel value and a plurality of secondary pixels having respective secondary pixel values, wherein the structure descriptor includes a plurality of structure indicators each associated with a respective secondary pixel, and wherein the respective structure indicators are based on the primary pixel value and the respective secondary pixel value of the associated secondary pixel;
based on the structure descriptor, determining a structure value for the m×n pixel block;
based on the structure value, applying image processing to the m×n pixel block to form a second m×n pixel block of the image;
determining a second structure descriptor for the second m×n pixel block;
based on the second structure descriptor, determining a second structure value for the second m×n pixel block; and
based on the structure value and the second structure value, merging the m×n pixel block and the second m×n pixel block, wherein merging the m×n pixel block and the second m×n pixel block comprises determining an absolute difference between the first structure value and the second structure value, determining that the absolute difference is greater than a threshold difference, and based on the absolute difference being greater than the threshold difference, assigning the m×n pixel block more weight than the second m×n pixel block during the merging.

12. The article of manufacture of claim 11, wherein determining the structure descriptor comprises:
setting the respective structure indicator for a secondary pixel to 0 if the secondary pixel has a secondary pixel value less than or equal to the primary pixel value; and
setting the respective structure indicator for the secondary pixel to 1 if the secondary pixel has a secondary pixel value greater than the primary pixel value.

13. The article of manufacture of claim 11, wherein applying image processing to the m×n pixel block comprises:
applying a first degree of de-noising if the structure value is less than or equal to a structure value threshold; and
applying a second degree of de-noising if the structure value is greater than the structure value threshold, wherein the first degree of de-noising involves more de-noising than the second degree of de-noising.

14. The article of manufacture of claim 11, wherein applying image processing to the m×n pixel block comprises:
applying a first degree of sharpening if the structure value is greater than a structure value threshold; and
applying a second degree of sharpening if the structure value is less than or equal to the structure value threshold, wherein the first degree of sharpening involves more sharpening than the second degree of sharpening.

15. The article of manufacture of claim 11, wherein the structure descriptor is an m×n block, and wherein determining the structure value comprises calculating a size of a least connected component in the structure descriptor, wherein the least connected component is a smallest contiguous group of structure indicators in the structure descriptor with a common value.

16. A computing device comprising:
at least one processor;
data storage; and
program instructions, stored in the data storage, that upon execution by the at least one processor cause the computing device to perform operations including:
determining a structure descriptor for an m×n pixel block of an image, wherein the m×n pixel block contains a primary pixel having a primary pixel value and a plurality of secondary pixels having respective secondary pixel values, wherein the structure descriptor includes a plurality of structure indicators each associated with a respective secondary pixel, and wherein the respective structure indicators are based on the primary pixel value and the respective secondary pixel value of the associated secondary pixel;
based on the structure descriptor, determining a structure value for the m×n pixel block;
based on the structure value, applying image processing to the m×n pixel block to form a second m×n pixel block of the image;
determining a second structure descriptor for the second m×n pixel block;
based on the second structure descriptor, determining a second structure value for the second m×n pixel block; and
based on the structure value and the second structure value, merging the m×n pixel block and the second m×n pixel block, wherein merging the m×n pixel block and the second m×n pixel block comprises determining an absolute difference between the first structure value and the second structure value, determining that the absolute difference is greater than a threshold difference, and based on the absolute difference being greater than the threshold difference, assigning the m×n pixel block more weight than the second m×n pixel block during the merging.

17. The computing device of claim 16, wherein determining the structure descriptor comprises:

setting the respective structure indicator for a secondary pixel to 0 if the secondary pixel has a secondary pixel value less than or equal to the primary pixel value; and setting the respective structure indicator for the secondary pixel to 1 if the secondary pixel has a secondary pixel value greater than the primary pixel value.

18. The computing device of claim 16, wherein applying image processing to the m×n pixel block comprises:

applying a first degree of de-noising if the structure value is less than or equal to a structure value threshold; and applying a second degree of de-noising if the structure value is greater than the structure value threshold, wherein the first degree of de-noising involves more de-noising than the second degree of de-noising.

19. The computing device of claim 16, wherein applying image processing to the m×n pixel block comprises:

applying a first degree of sharpening if the structure value is greater than a structure value threshold; and applying a second degree of sharpening if the structure value is less than or equal to the structure value threshold, wherein the first degree of sharpening involves more sharpening than the second degree of sharpening.

20. The computing device of claim 16, wherein the structure descriptor is an m×n block, and wherein determining the structure value comprises calculating a size of a least connected component in the structure descriptor, wherein the least connected component is a smallest contiguous group of structure indicators in the structure descriptor with a common value.

* * * * *